(12) United States Patent
Moore

(10) Patent No.: US 8,967,039 B2
(45) Date of Patent: Mar. 3, 2015

(54) AVOCADO SKINNING AND PULPING DEVICE

(76) Inventor: Richard Moore, Chula Vista, CA (US)

(*) Notice: Subject to any disclaimer, the term of this patent is extended or adjusted under 35 U.S.C. 154(b) by 238 days.

(21) Appl. No.: 13/443,802

(22) Filed: Apr. 10, 2012

(65) Prior Publication Data

US 2013/0025474 A1   Jan. 31, 2013

Related U.S. Application Data

(63) Continuation-in-part of application No. 12/628,806, filed on Dec. 1, 2009, now abandoned.

(51) Int. Cl.
*A23N 7/08* (2006.01)
*A47J 17/00* (2006.01)
*A23N 1/02* (2006.01)
*A23N 7/10* (2006.01)

(52) U.S. Cl.
CPC .. *A23N 1/02* (2013.01); *A23N 7/10* (2013.01); *A23N 7/08* (2013.01)
USPC ................. 99/540; 99/547; 99/562; 99/563; 426/485

(58) Field of Classification Search
USPC ........... 99/540, 544, 547, 550, 551, 562, 563, 99/565, 566, 567, 568, 574, 575, 579, 584, 99/585, 616; 426/481, 482, 485; 198/626.1–626.6
See application file for complete search history.

(56) References Cited

U.S. PATENT DOCUMENTS

| | | | |
|---|---|---|---|
| 805,369 A * | 11/1905 | Marshall | 99/587 |
| 940,327 A * | 11/1909 | Knapp | 99/547 |
| 2,500,981 A | 3/1950 | Emile | |
| 2,582,636 A * | 1/1952 | Kruse et al. | 99/563 |
| 2,659,298 A | 11/1953 | Hudson | |
| 3,351,000 A | 11/1967 | Bruce | |
| 3,480,057 A | 11/1969 | Wilhelm | |
| 3,482,615 A * | 12/1969 | Adle et al. | 426/482 |
| 3,618,651 A | 11/1971 | Hart | |
| 3,691,942 A * | 9/1972 | Wagley | 100/151 |
| 3,811,000 A | 5/1974 | Lazzarini | |
| 3,818,821 A | 6/1974 | Kendall | |
| 3,826,185 A * | 7/1974 | Vadas | 99/548 |
| 3,853,016 A * | 12/1974 | Lane et al. | 198/698 |
| 3,862,345 A | 1/1975 | Westover et al. | |
| 3,931,881 A * | 1/1976 | Bickel et al. | 198/817 |
| 3,964,715 A | 6/1976 | Burgess, Jr. | |

(Continued)

FOREIGN PATENT DOCUMENTS

JP    06253804    9/1994

*Primary Examiner* — Gene Kim
*Assistant Examiner* — John E Simms, Jr.
(74) *Attorney, Agent, or Firm* — Steins & Associates, P.C.

(57) ABSTRACT

An Avocado Skinning and Pulping Device. The avocado pulper has two grip belts approximately oval in shape and further having a plurality of grip plates around the grip belts. The grip plates are knurled thereby facilitating a grasping of an avocado as it is conveyed into the grip belts and rides through to the rear opening. A pivotable and adjustable belt guide within an inner section of each grip belt is adapted to exert maximum squeezing pressure on the avocado at the approximate middle section of the grip belts at which point the grip belts are in approximate contact with one another. Pulp is thereby squeezed from the avocado. The grip belts separate at the approximate rear defining space for releasing the skin of the avocado. A de-seeder adjacent to the front end opening of the grip belts removes the seed from the avocado prior to its entry into the maximum squeezing section.

30 Claims, 13 Drawing Sheets

(56) References Cited

U.S. PATENT DOCUMENTS

| | | | |
|---|---|---|---|
| 4,069,911 A * | 1/1978 | Ray | 198/626.5 |
| 4,079,551 A * | 3/1978 | Bando | 451/260 |
| 4,294,861 A * | 10/1981 | Ifuku et al. | 426/475 |
| 4,355,572 A | 10/1982 | Silvestrini | |
| 4,590,643 A * | 5/1986 | Hill | 452/112 |
| 4,600,593 A | 7/1986 | Swisher | |
| 4,629,629 A | 12/1986 | David | |
| 4,708,056 A | 11/1987 | Dinanath | |
| 4,770,887 A | 9/1988 | Tarry | |
| 4,834,156 A * | 5/1989 | Forslund | 144/250.17 |
| 5,168,802 A | 12/1992 | Silvestrini | |
| 6,612,226 B2 | 9/2003 | Schrader | |
| 7,387,197 B2 * | 6/2008 | Sprouse et al. | 198/626.1 |
| 7,444,930 B2 | 11/2008 | Moore | |
| 2001/0048960 A1 | 12/2001 | Suter | |

\* cited by examiner

AVOCADO SKINNING AND PULPING DEVICE

This application is a continuation-in-part of application Ser. No. 12/628,806, filed Dec. 1, 2009 (the "parent application"), now abandoned.

BACKGROUND OF THE INVENTION

1. Field of the Invention

This invention relates generally to food processing equipment and, more specifically, to an Avocado Skinning and Pulping Device.

2. Description of Related Art

Avocados have become more and more popular for their versatility and arguable health-related benefits. They come in various varieties and sizes. For example, West Indian avocados produce enormous, smooth round, glossy green fruits that are low in oil and can weigh up to two pounds. Guatemalan varieties produce medium ovoid or pear-shaped, pebbled green fruits that turn blackish-green when ripe. The fruit or pulp of Mexican versions of avocado tends to be smaller (six to ten ounces) with skins that turn glossy green or black when ripe.

The pulp of avocados is deep green near the skin, becoming yellowish nearer the single large, inedible ovoid seed. The pulp is hard when harvested but softens to a buttery texture as the avocado ripens. Avocados are high in monosaturates and the oil content is second only to olives among fruits in its health benefits. Clinical feeding studies in humans have shown that avocado oil can actually reduce blood cholesterol. To effectively obtain the pulp of an avocado, the avocado must be de-skinned and the seed must be removed.

In many cases, fruits (such as avocados) and vegetables are more easily de-skinned by the heating of these foods. Such heating does not adversely affect the flavor, texture, or appearance of most such foods. Processing avocados by first heating for the purpose of de-skinning them, however, is not nutritionally sound. Avocados are a fruit which is extremely sensitive to heat. This is particularly so in its green (chlorophyll) layer of its pulp as it lies immediately below the skin and, consequently, is subject to greatest heat exposure and nutritional loss and flavor loss. Additionally, avocado skins are particularly thick and/or rough and most processing techniques are manual or if mechanized, the apparatus is expensive, complex, and not as efficient as desired in that usable pulp is lost in the process.

Because of their existing and ever-growing popularity, there continues to be a need to effectively and efficiently remove the pulp from an avocado for processing regardless of the size or type of avocado being processed. The prior art has numerous de-skinning or peeling machines and pulp or fruit removal machines which have been cited in the parent application. Most are extremely complex, somewhat cumbersome, and costly to manufacture and maintain.

The instant inventor previously solved many of the problems associated with pulp removal and skin/seed disposal in his prior issued patents and pending patent applications (U.S. Pat. No. 7,444,930 and application Ser. Nos. 11/845,184, 11/845,233, 12/423,356, and 12/628,806); all of which are hereby incorporated by reference.

This current avocado pulper, however, is an even more vast improvement to all prior-art devices. It will de-seed, de-pulp, and de-skin an avocado with little human intervention; and, in the same amount of time, will produce more pulp than with any prior-art device and less waste of usable product will result. Unwanted items [skin and seed] will not be co-mingled with the pulp. Moreover, with the relative "flexibility" if the grip belts and the de-seeder, a hard avocado pulp or a stray seed will not jam the avocado pulper. Furthermore, disassembly of the device for cleaning and maintenance has been greatly improved. All these advances and at a speed of production unsurpassed by any other device.

The foregoing has outlined some of the more pertinent objects of the avocado pulper of this disclosure. These objects should be construed to be merely illustrative of some of the more prominent features and applications of the avocado pulper of this disclosure. Many other beneficial results can be attained by applying the disclosed avocado pulper of this disclosure in a different manner or by modifying the avocado pulper of this disclosure within the scope of the disclosure. Accordingly, other objects and a fuller understanding of the avocado pulper of this disclosure may be had by referring to the summary of the avocado pulper of this disclosure and the detailed description of the preferred embodiment in addition to the scope of the avocado pulper of this disclosure defined by the claims taken in conjunction with the accompanying drawings.

SUMMARY OF THE INVENTION

In light of the aforementioned problems associated with the prior devices and systems, it is an object of the present invention to provide an Avocado Skinning and Pulping Device. The avocado pulper has two grip belts approximately oval in shape with each grip belt being chain-driven and having a plurality of knurled grip plates therearound. The grip plates grasp an avocado as it is conveyed into the front end opening of the grip belts and rides through the grip belts to the rear opening. A pivotable and adjustable belt guide within an inner section of each grip belt is adapted to exert maximum squeezing pressure on the avocado at the approximate middle section of the grip belts at which point the grip belts are in approximate contact with one another. Pulp is squeezed from the avocado and retrieved. The grip belts separate at the approximate rear defining a rear opening for releasing the skin of the avocado for disposal. A de-seeder adjacent to the front end opening of the grip belts removes the seed from the avocado prior to its entry into the maximum squeezing section. The improvements of this device over its parents relates critically to the design for the disassembly of the grip belt mechanisms, such as for cleaning or maintenance. As herein presented, such disassembly and reassembly can be completed rapidly and without the need for additional tools or equipment.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Avocado Skinning and Pulping Device.

Figure 1:
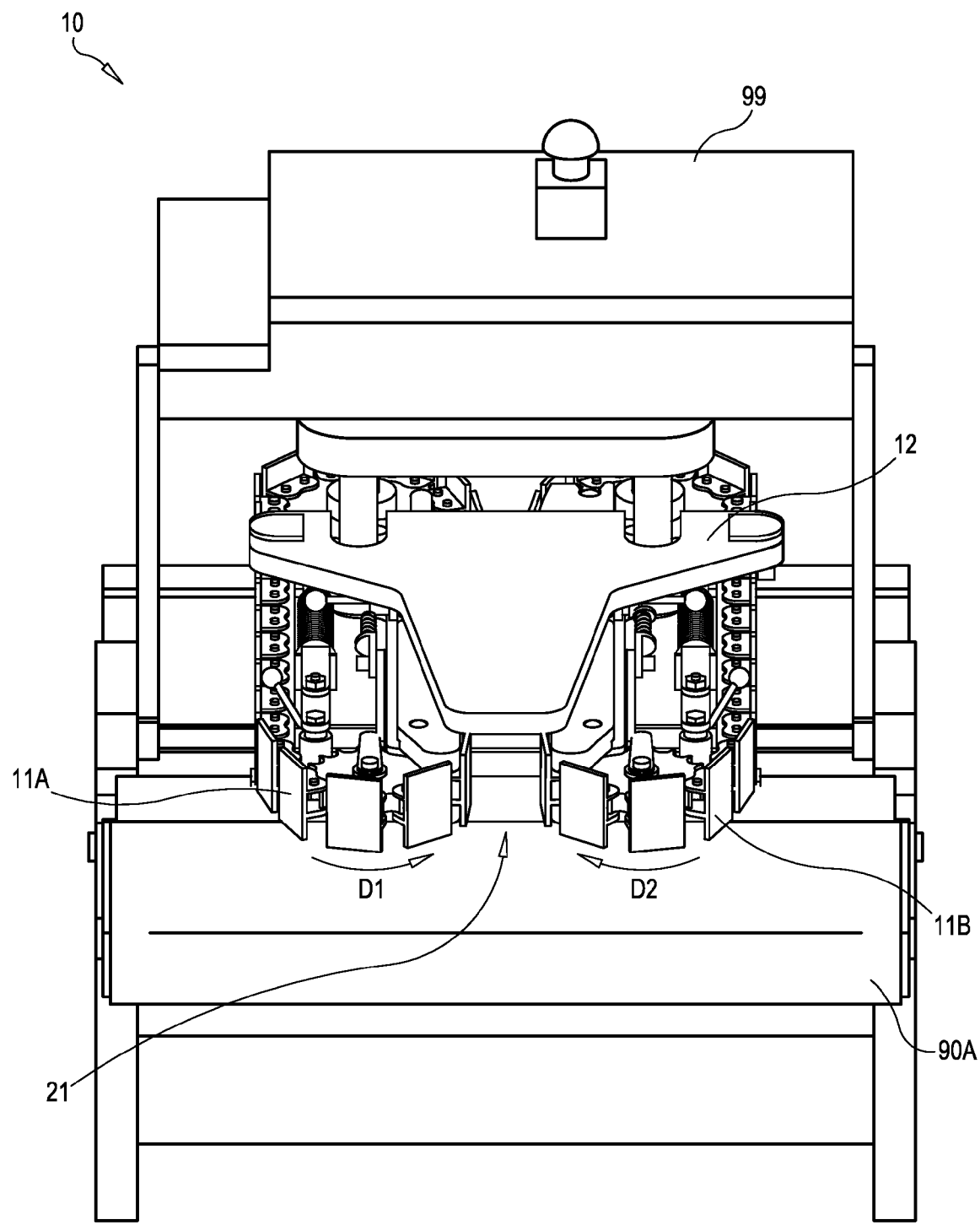
FIG. 1 is a front view of a preferred embodiment of the avocado pulper of the present invention.

The present invention can best be understood by initial consideration of FIG. 1. FIG. 1 is a front view of a preferred embodiment of the avocado pulper 10 of the present invention. The general operation of this version of the pulper 10 is very similar to that of the parent device. A conveyor belt 90A feeds cut avocados into the front opening 21 of the device 10 in order to commence the processing. The first grip belt 11A and second grip belt 11B operate in counter-rotating fashion (see respective directions D1 and D2), and thereby draw the avocado-halves into the gap between the belts 11A, 11B. The design of these belts 11A, 11B are essentially the same as described in the Parent Application, such description being incorporated herein by reference. As will be discussed more fully below, the seed is ejected out from the bottom of gap between the belts 11A, 11B, and the skin is dropped out of the rear exit of the gap between the belts 11A, 11B.

The belts 11A, 11B continue with the design previously depicted and discussed in the Parent Application, and such description is incorporated herein by reference. Specifically, the face of each grip plate is knurled. Any roughening of the surfaces will suffice but a more structured approach has been shown to provide superior results. A plurality of grooves are cut vertically through each grip plate forming in the process first peaks. Second grooves are cut perpendicular to the first grooves forming in the process second [cross or intersecting] peaks.

The faces of each grip plate further has a pair of parallel radial cuts formed in them. The radial cuts bear an arc approximately equal to the radius of the drive gear and such is represented in the Parent Application by arc-W. Each radial cut is aligned with the scraping members [25] and to touchingly communicate therewith. This arc-W, being approximately equal to the radius of the drive gear, causes the scraping members to maintain virtual constant communication with the radial cuts as the grip plates rotate and pass by (rather than hitting the outer edges and missing the central portion of the face of the grip plate).

It is noted that in non-depicted versions of the device 10, there are actually two pairs of grip belts 11A, 11B forming a pair of side-by-side "pulping" stations at a single piece of equipment, This reduces cost and complexity by consolidating and reducing the number of mechanical drive units, including conveyors and motors.

There are important differences between this new design 10 and that described in the Parent Application. Specifically, the tensioning and release mechanisms of the two belts 11A, 11B have been changed in order to provide more reliable separation of the seed and skin from the avocado meat, to resist the clogging or sticking that can result from the processing of inconsistently-ripened avocados, the device has been altered to handle fully halved avocados (as opposed to avocados having the meat and skin cut in half, but still having a full seed when being "pulped," as was the device of the Parent Application), and finally to allow the operators of the device 10 to easily disassemble the belt 11A, 11B mechanism for cleaning and/or repair without the need for specialty tools or extensive training.

One structural difference that can be seen in this view is the addition of the upper guide plate 12. The upper guide plate 12 is preferably made from one of a variety of common plastic materials suitable for its durability, hardness and resistance to staining or contamination through absorption (since food products are made using the machine 10). The upper guide plate 12 functions prevent avocado pieces from flying upward from between the two grip belts 11A, 11B, and further to guard against items from being indavertantly dropped between, or snagged by, the belts 11A, 11B. Finally, the plate 12 prevents operators from accidentally disengaging the tensioning levers that serve to tens ion and de-tension the guide belts for removal/maintenance as will be discussed more fully below.

Figure 2:
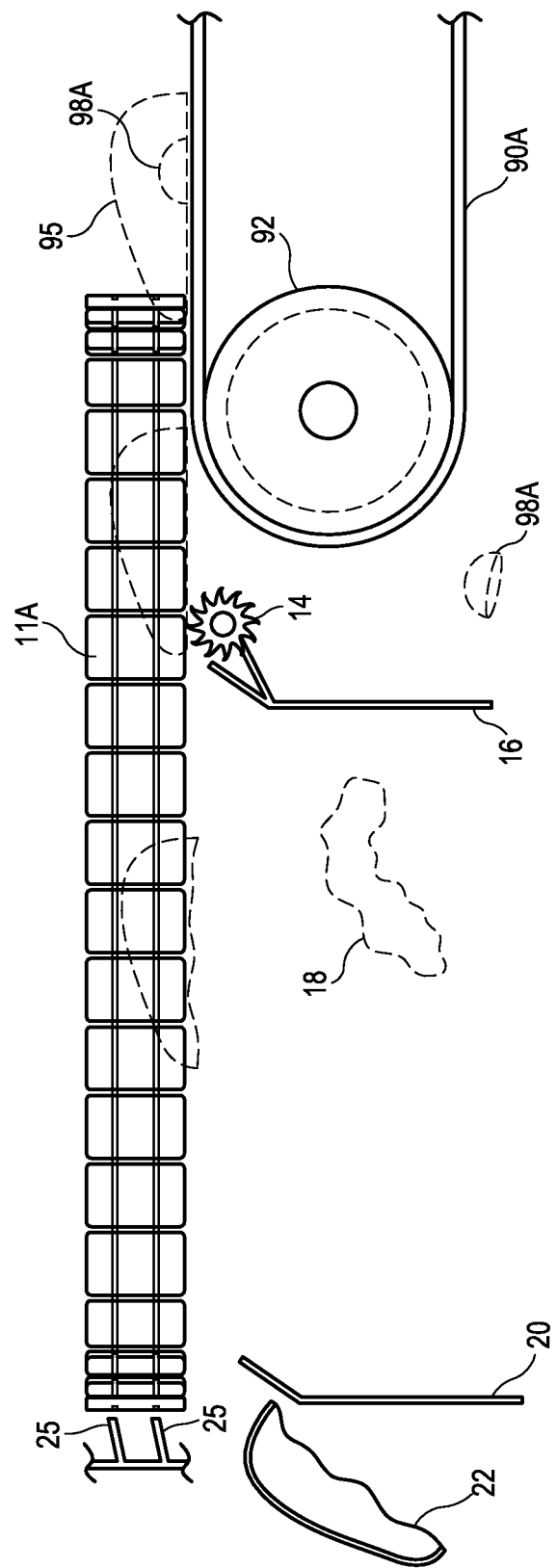
FIG. 2 is a partial cutaway side view of the device of FIG. 1.
Figure 3B:
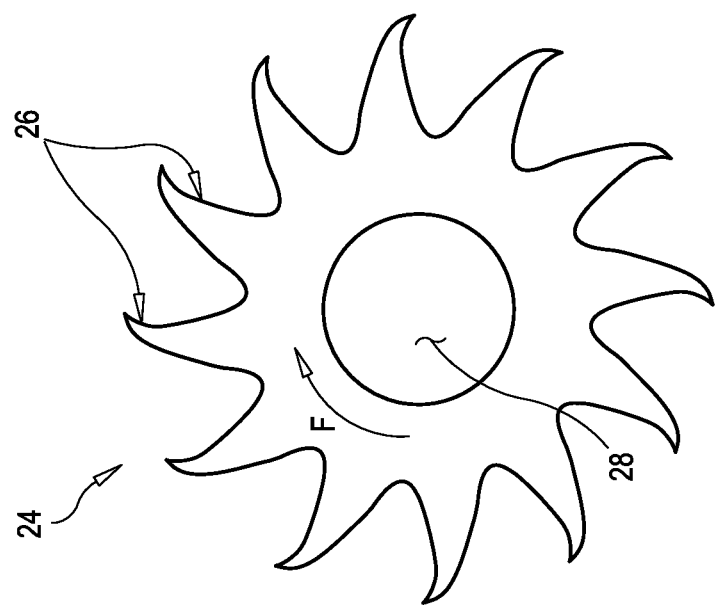
FIGS. 3A and 3B are partial front and side views, respectively, of the de-seeder subassembly of the device of FIGS. 1 and 2.
Figure 3A:
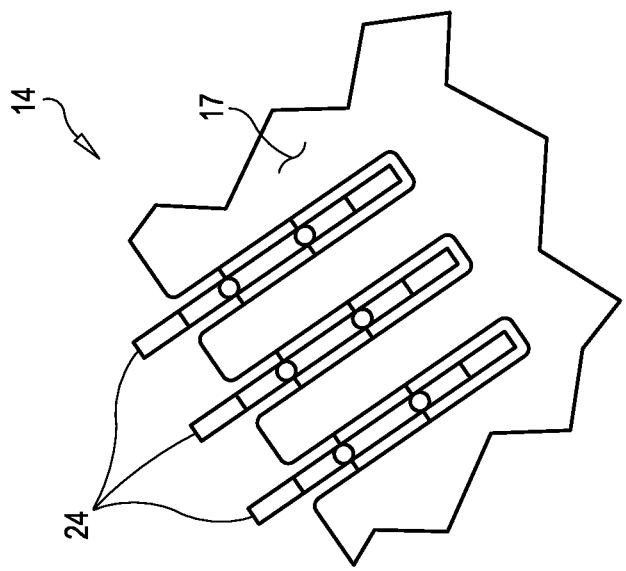

The upper guide plate 12 can be lifted off from the top of the grip belt assembly preferably without the need for any special tools or equipment. Consequently, maintenance requirements for the pulper 10 will be expedited to reduce the expected downtime of the equipment for routine cleaning, repair and/or adjustment as compared to the parent devices. FIGS. 2, 3A and 3B illuminate the details of the pulping process executed by this improved device 10.

FIG. 2 is a partial cutaway side view of the device 10 of FIG. 1, and FIGS. 3A and 3B are partial front and side views, respectively, of the de-seeder subassembly 14 of the device of FIGS. 1 and 2. In contrast to the device of the Parent Application, the instant device 10 is designed to process avocados 95 that have been completely cut in half (seed, meat and skin), rather than leaving the seed as a single whole piece. Since the seed 98A is halved, the fruit will lay flat on the conveyor belt 90A—this eliminates the need for the depressions in the belt found in the device of the Parent Application.

As the avocado 95 rides on the conveyor 90A it enters into the two rotating grip belts 11A, 11B at the front opening 21. As the belts converge at their approximate middle, the avocado 95 is more fully grabbed. Slightly forward of the middle there is positioned a de-seeder 16 and slightly rearward of the de-seeder 16 is a seed divider 16. The de-seeder 16 comprises one or more rotating wheel-like structures 24 each having a plurality of protruding spikes or prongs 26 in a star-like or hook-like fashion. Each wheel-like structure 24 rotates in a direction "F" opposite to the direction of travel of the avocados 95.

The star-like nature of the prongs 26 project into the seed 98A and, by the respective movements of the wheel-like structures 24 and avocado 95, extract and eject the seed 98A from the avocado 95. The seed divider 16 prevents contamination or co-mingling of the extracted seed-half 98A with the pulp 18 which will be squeezed from the avocado 95 as it progresses rearward and is squeezed by the grip belts 11A, 11B in combination with the belt guides (see FIGS. 6 and 7).

The wheel-like structures 24 of the de-seeder 14 are cleaned by a cooperating comb-like structures 17 having protruding fingers, and are in touching communication with each wheel-like structure 24 to thereby scrape the wheel-like structures 24 and clear any seed 98 residue therefrom.

This squeezing more effectively occurs at a point rearward of the middle of the grip belts 11A, 11B and slightly rearward of the seed divider 16. The avocado 95 and its skin 22 rides generally fully within the grip belts 11A, 11B and at the central section of the belts 11A, 11B (between the seed divider 16 and the out edge of the belts 11A, 11B), maximum inward biasing by the belt guide elements (which will be discussed in more detail in connection with subsequent drawing figures), thereby, squeezing out the pulp 18. The pulp 18 falls to a point rearward of the seed divider 16 and forward of the upper end shield 20. Squeezing pressure diminishes at a point rearward of the upper end shield 20, and wherein a slight separation between each grip belt 11A, 11B occurs, which causes the skin 22 to be discarded. The scraping members 25 remove any residual skin 22 from the belts 11A, 11B.

Figure 4:
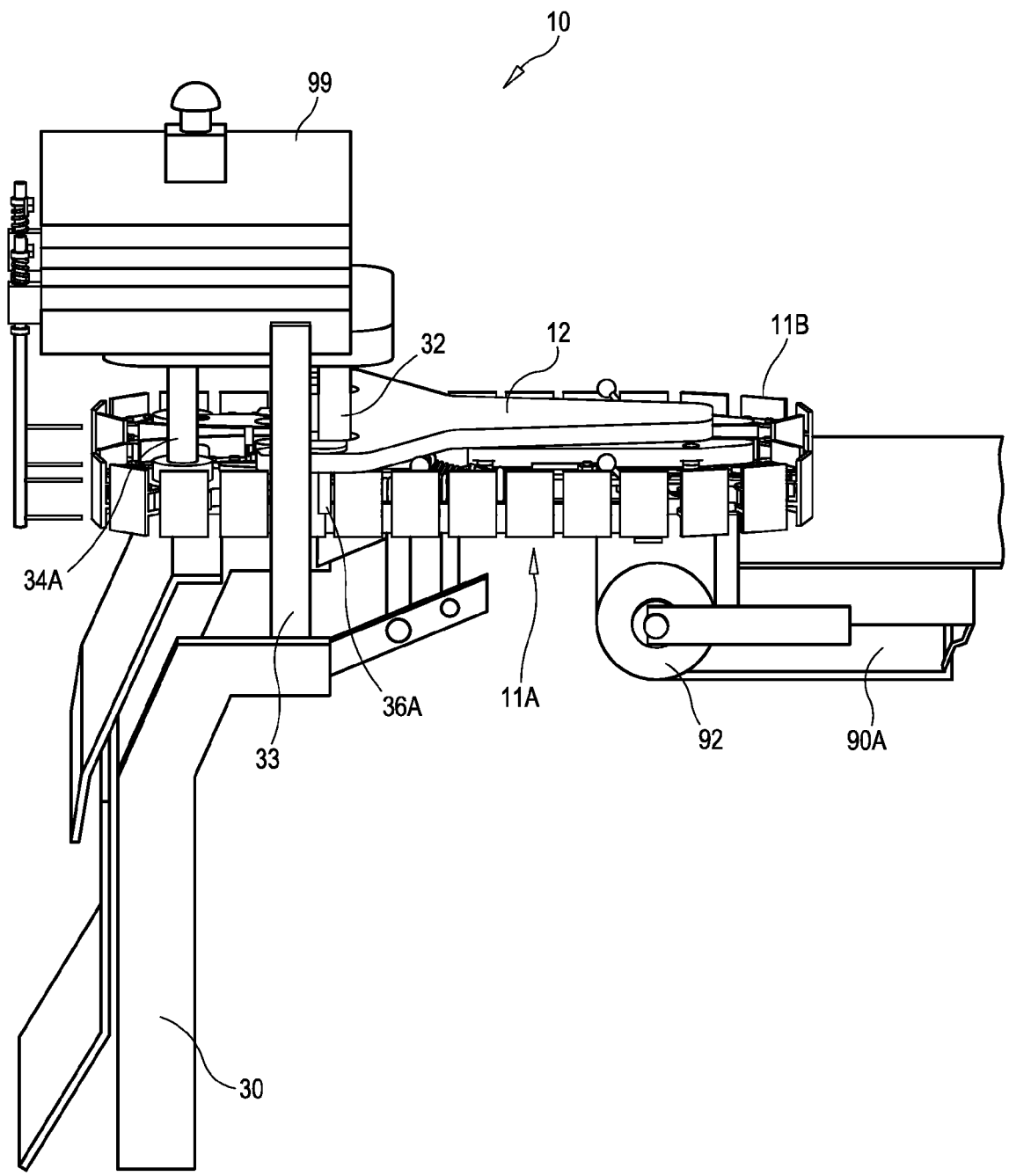
FIG. 4 is a side perspective view of the device of FIGS. 1 and 2.

FIG. 4 is a side perspective view of the device 10 of FIGS. 1 and 2. The bulk of the elements of the device 10 are attached to, and supported by, the base frame 30. This simplified mounting structure facilitates the cleaning and maintaining of this improved device. From this viewing angle, we can see one each of the pair of mounting posts 32 and support struts 33. The support struts 33 on either side of the housing 99 interconnect the motor drive and other components within the housing 99 to the base frame 30. The mounting posts 32 extend downward from the housing 99 to rigidly support the grip belts 11A, 11B and their associated tensioning mechanisms, including the idler gears.

Each grip belt 11A, 11B has an individual drive gear driving its rotation, with the two drive gears being synchronized so that the two belts 11A, 11B are also moving synchronously. The drive gear for the first grip belt 11A is driven to rotate by the first drive shaft 34A, which is driven by the motor drive located within the housing 99, and supported above the belts 11A, 11B.

Figure 5:
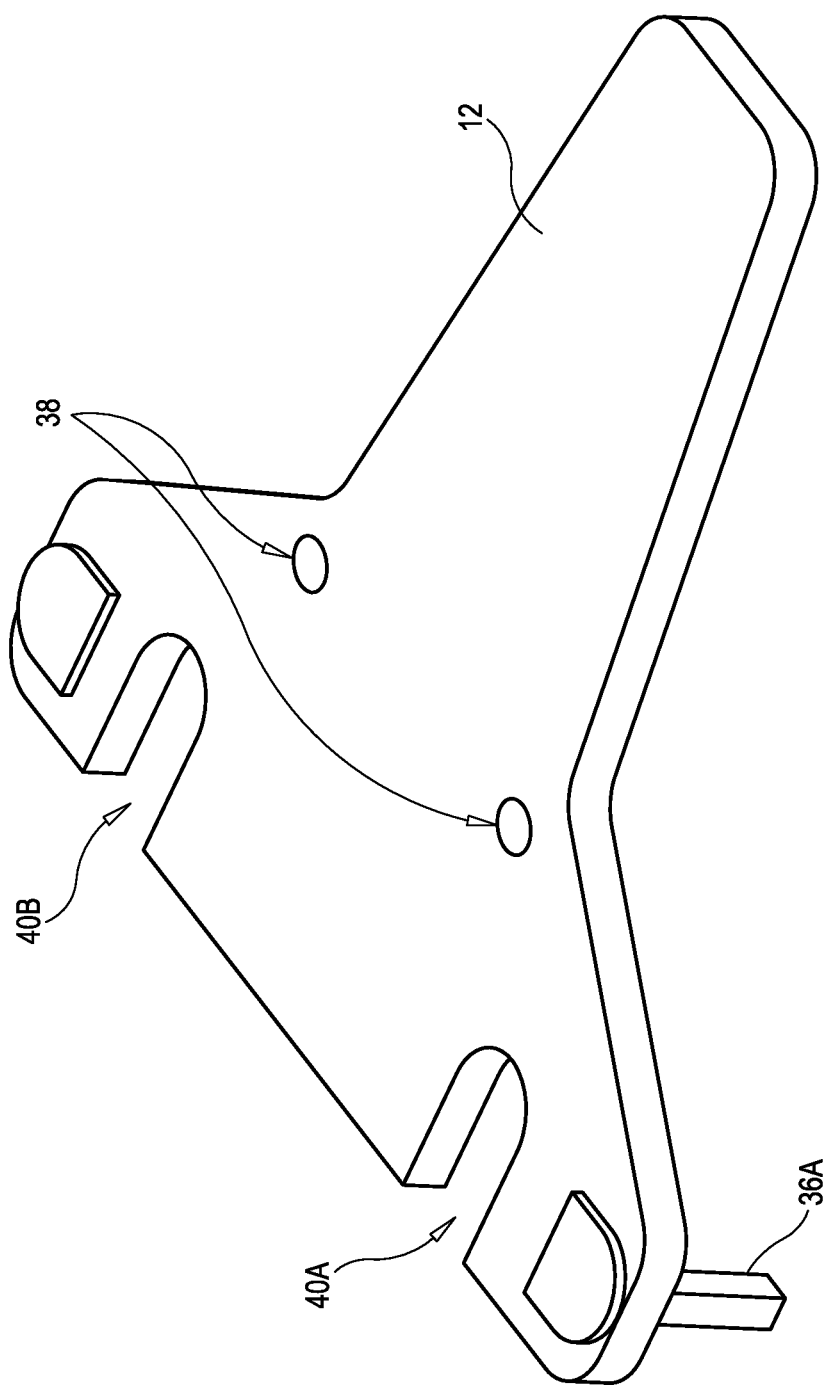
FIG. 5 is a perspective view of a newly-invented element of the device of FIGS. 1, 2 and 4.

An additional feature viewable from this perspective is one of the pair of "squeegee" pegs 36A. Each peg (36B is not shown in this view) extends downwardly from the upper guide plate 12 outside of each of the grip belts 11A, 11B. The pegs (e.g. 36A) have a rubberized coating and are positioned close to the face of their respective grip belt (e.g. 11A) so that any buildup of avocado meat will be scraped off of the entire face of each segment of the belt. It has been found that the addition of these pegs (e.g. 36A) provides additional improvement in the gripping reliability of the belt segments, and therefore also improves the reliability of the avocado skin removal processing. FIG. 5 provides additional detail regarding these features.

Figure 6:
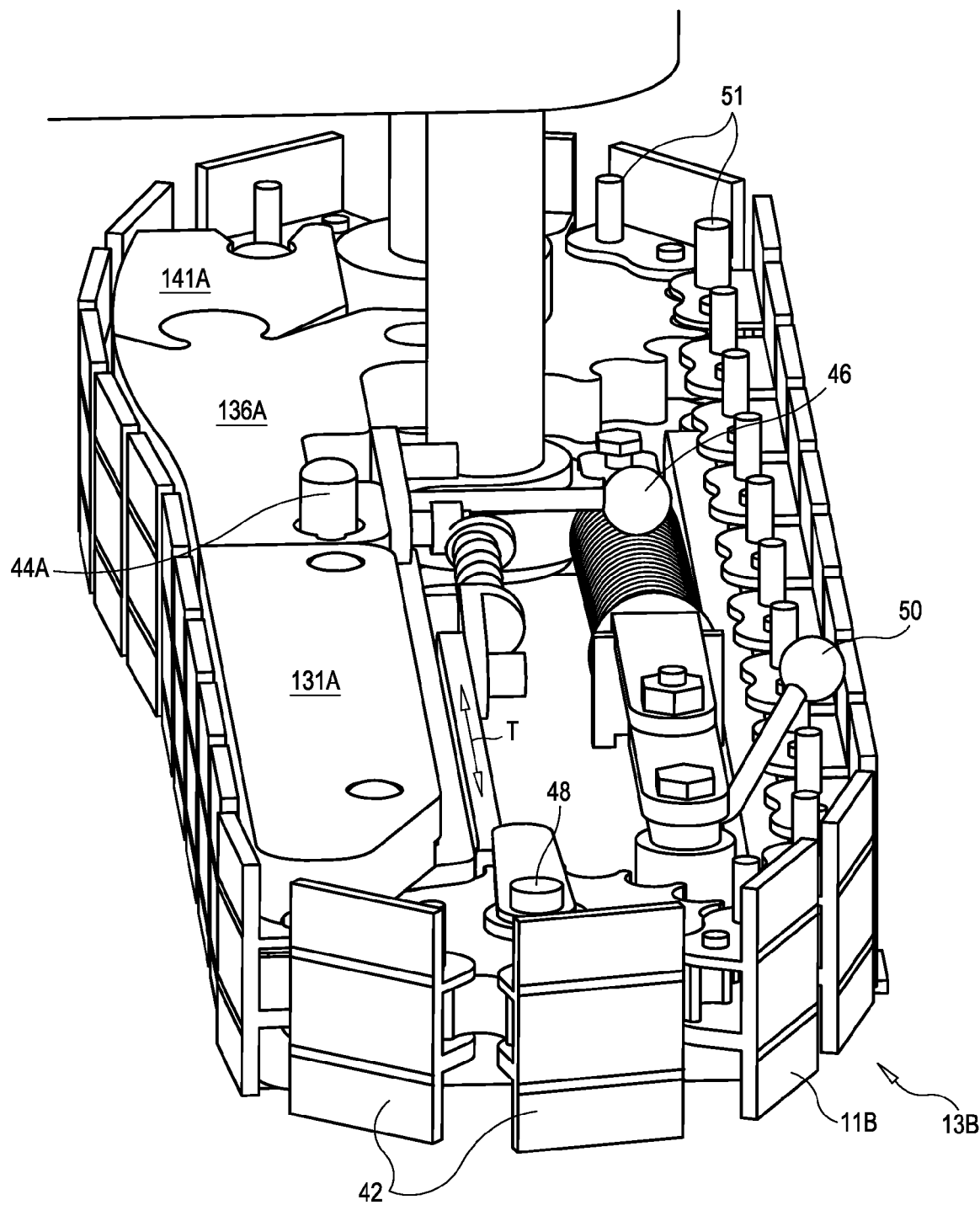
FIG. 6 is a front perspective view of one portion of the belt mechanism of the device of FIGS. 1-2.

FIG. 5 is a perspective view of a newly-invented element of the device of FIGS. 1, 2 and 4—the upper guide plate 12. As discussed previously, the upper guide plate 12 can be removed from the device [10] without the need for tools (the use of square brackets [ ] denotes that the identified element is not depicted in the instant drawing figure). It is retained on the device [10] over the top of the grip belts by cooperation between a pair of pegs that extend upwardly from the grip belt tensioning elements. Those upwardly-extending support pegs insert into the pair of apertures 38 formed through the upper guide plate 12. The weight of the plate 12 and associated elements is sufficient to retain the plate 12 atop the support pegs. The squeegee pegs (e.g. 36A) extend downward from the upper guide plate 12 a distance of 1.5 to 3.0 inches. These pegs (collectively 36) can be removed and replaced, such as to rejuvenate the rubberized coating on the pegs. The notches 40A and 40B are oriented to accept the two mounting posts [32] therein so that the guide plate 12 can extend far enough along the length of the grip belts to the back-end of the machine to adequate guard against avocado materials from flying up from the grip belts. FIG. 6 begins to illuminate the grip belt mechanism and its improvements as compared to the device of the Parent Application.

FIG. 6 is a front perspective view of one portion of the belt mechanism of the device of FIGS. 1-2 and 3-4. Generally speaking each grip belt mechanism comprises the gears, sprockets, shafts, tensioners, levers and related linkages, springs and the grip belts themselves, as these elements are involved in the support, guidance and movement of the individual grip belts. Here, the right-side grip belt mechanism 13B (to the reader's right in FIG. 1) is depicted.

The grip belt 11B is made up from a plurality of chain-link-type belt elements 42 as is extensively described in the Parent Application, as well as more than one of the prior parent applications. That description is incorporated herein by reference. One critical aspect of the instant design that distinguishes it from the device of the Parent Application is the tensioning/release/guide subassemblies. These elements have been redesigned in order to render them more effective at handling the avocados as they are being "pulped," and further to make the entire machine much easier to disassemble for cleaning and repair. The success of these improvements has been demonstrated to increase the uptime of the machine, as well as the throughput of the machine when it is in operation.

The grip belt 11B is driven by a drive gear at the rear of the current view and an idler gear at the front of the current view. These gears maintain the oval shape of the belt 11B. In order to provide the desired squeezing force against avocados being processed, while also "flexing" around the pieces of fruit as they pass between the belts [11A], 11B, there is a multi-piece inner guide train made up of a front guide section 131A, an intermediate guide section 136A and a rear guide section 141A. As can be imagined, the mirror-image of this inner guide train operates on the first grip belt [11A].

Each guide section 131A, 136A, 141A has suitable apertures formed through it for the purpose of mounting these elements to the metallic structure of the tensioning framework. One element of note is the first mounting peg 44A that protrudes substantially above the top surface of the intermediate guide section 136A. The first mounting peg 44A cooperates with the right-side aperture [38] formed through the upper guide plate [12], and is responsible for retaining the upper guide plate [12] in place atop of the pair of grip belt mechanisms.

There are two hand-operated levers provided as a part of the grip belt mechanism 13B. The gear tension release lever 46 is operated in the direction "B" to provide transverse tension (and alternatively to release such tension) onto the outer side of the grip belt 11B. The gear tension release lever 46 is operable to provide longitudinal tension (and alternatively release such tension) on the idler gear shaft 48, by causing the idler gear shaft linkage to move in direction "T." As should be apparent, moving the idler gear shaft 48 in direction "T" will either cause the grip belt 1 lB to be more tautly held by the drive and idler gears, or it will cause the grip belt 11B to be loosened from those gears (presumably for the purpose of removing the grip belt 11B from the gears. For the purpose of future reference, a pair of chain link pegs 51 are identified. Each belt element 42 is connected to the two adjacent belt elements 42 essentially the same as a conventional bicycle drive chain. Just as the chain links are attached to one another by roller links, so are the adjacent belt elements 42 interconnected. Additional information regarding both tensioning mechanisms is provided in FIG. 7.

Figure 7:
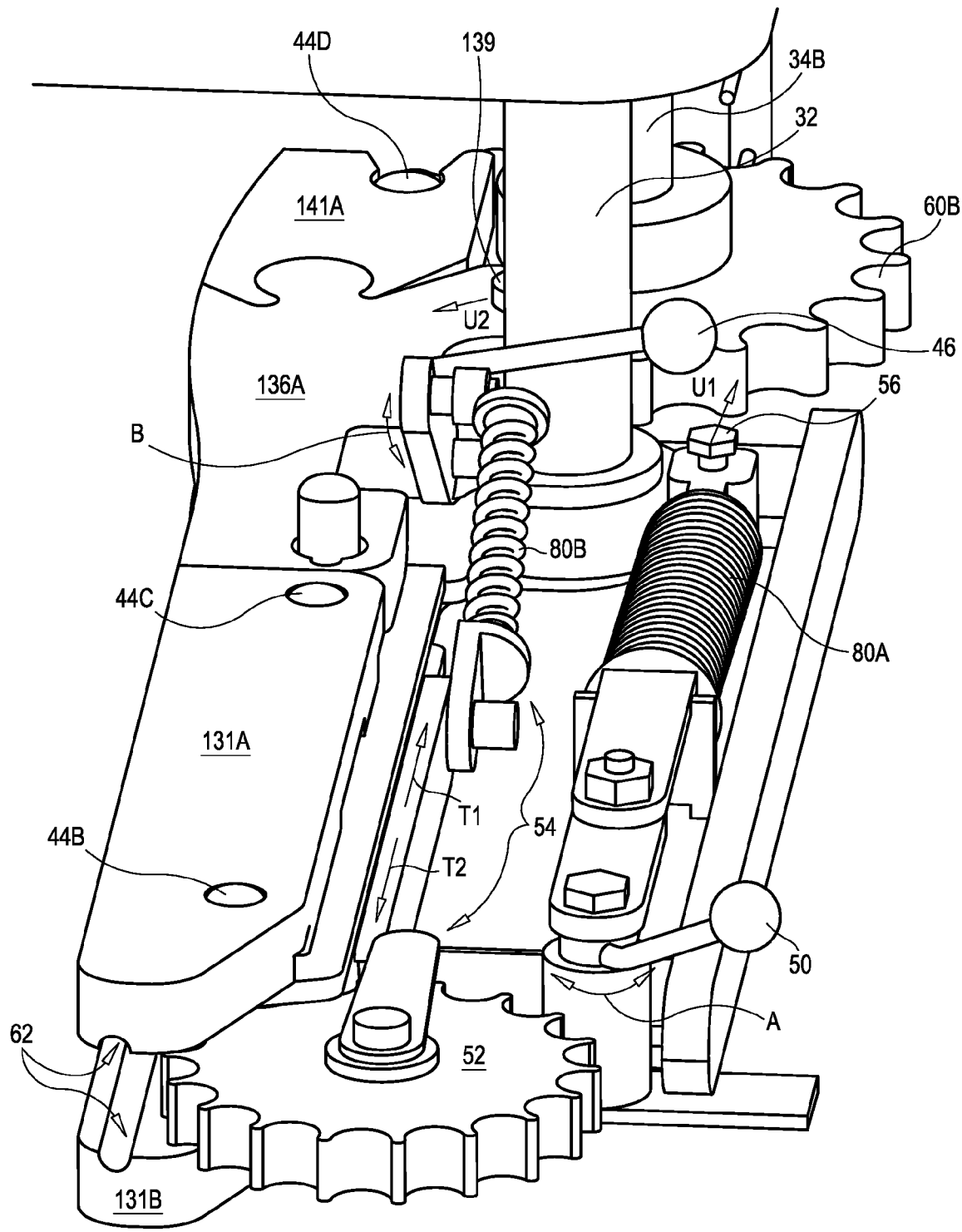
FIG. 7 is a front perspective view of the belt mechanism of FIG. 6 being partially disassembled.

FIG. 7 is a front perspective view of the belt mechanism [13B] of FIG. 6 being partially disassembled. The mounting post 32 supports all of these elements in a position in spaced relation to the front conveyor belt [90A]. The second drive shaft 34B is driven by the main motor drive unit, which is not depicted in this drawing figure. The second drive shaft 34B drives the second drive gear 60B, the teeth of which drive the grip belt [11B] to rotate. The idler gear 52 (at the front end of the mechanism [13B]) supports the front end of the grip belt "oval" and allows it to move freely.

The top guide sections 131A-141A have corresponding bottom guide sections 131B, 136B, 141B that attach to the underside of the mechanism [13B]—under the idler gear 52 and second drive gear 60B. Each set of guide section has belt grooves 62 formed in one face as shown (i.e. so that the grooves on the top sections face the grooves on the bottom section). The grooves 62 retain the heads of the chain link segment pegs [51] as the grip belts [e.g. 11B] are driven to rotate around the mechanism [e.g. 13B].

As should be apparent, moving the gear tension release lever 46 upward (in along arc "B") will cause the gear release linkage 54 to move away ("T1") from the reader in this view. This in turn allows the idler gear 52 to move in the same direction, which releases the tension on the grip belt.

When in operation, the gear tension release lever 46 is pushed (along arc "B") to the down position (towards the reader in this view), which causes the gear release linkage 54 and idler gear 52 to move in direction "T2," which exerts tension on the grip belt [11B] as it is suspended around the idler gear 52 and second drive gear 60B. Tension on the grip belt [11B] is maintained by the gear biasing spring 80B, which substitutes for a direct linkage connection between the lever 46 and the linkage 54. The tension exerted by this spring 80B allows the mechanism to self-adjust tension if component wear tends to loosen a grip belt.

In another non-depicted version, the gear tension release lever 46 is oriented to rotate in a horizontal plane (i.e. the shaft on which it rotates is oriented vertically) when tensioning and detensioning the grip belt. This non-depicted version is implemented in order to remove potential impingement between the lever 46 and a guide belt.

The chain link segments are "sandwiched" between the upper (131A, 136A, 141A) and lower (131B, 136B, 141B) guide sections (on the avocado-facing side of the belt mechanism [13B].

In addition to the first mounting peg [44A], second 44B, third 44C and fourth 44D mounting pegs hold the guide sections 131A-141A in place and allow them to flex and move as necessary to accommodate the passing of avocados through the machine. Pinching mechanism 58 is actuated by moving pinching release lever 50 in direction "A." When moved towards the "tension" position (away from the reader in this view), the biasing spring 80A will drive the biasing post 56 in direction U1 (away from the reader). The biasing post 56 causes the pinching post 139 to move in direction U2 by action of an angle drive element (located beneath the drive gear 60B) that rotates about the mounting post 32. The biasing element 80A exerts sufficient pressure against the biasing post 56 and resultingly against the pinching post 139 so that the two guide belts (i.e. by virtue of the matching pinching mechanisms on each grip belt) will be pushed together firmly enough to squeeze the meat and seed out of the skins, but not so hard as to damage the fruit.

Figure 8:
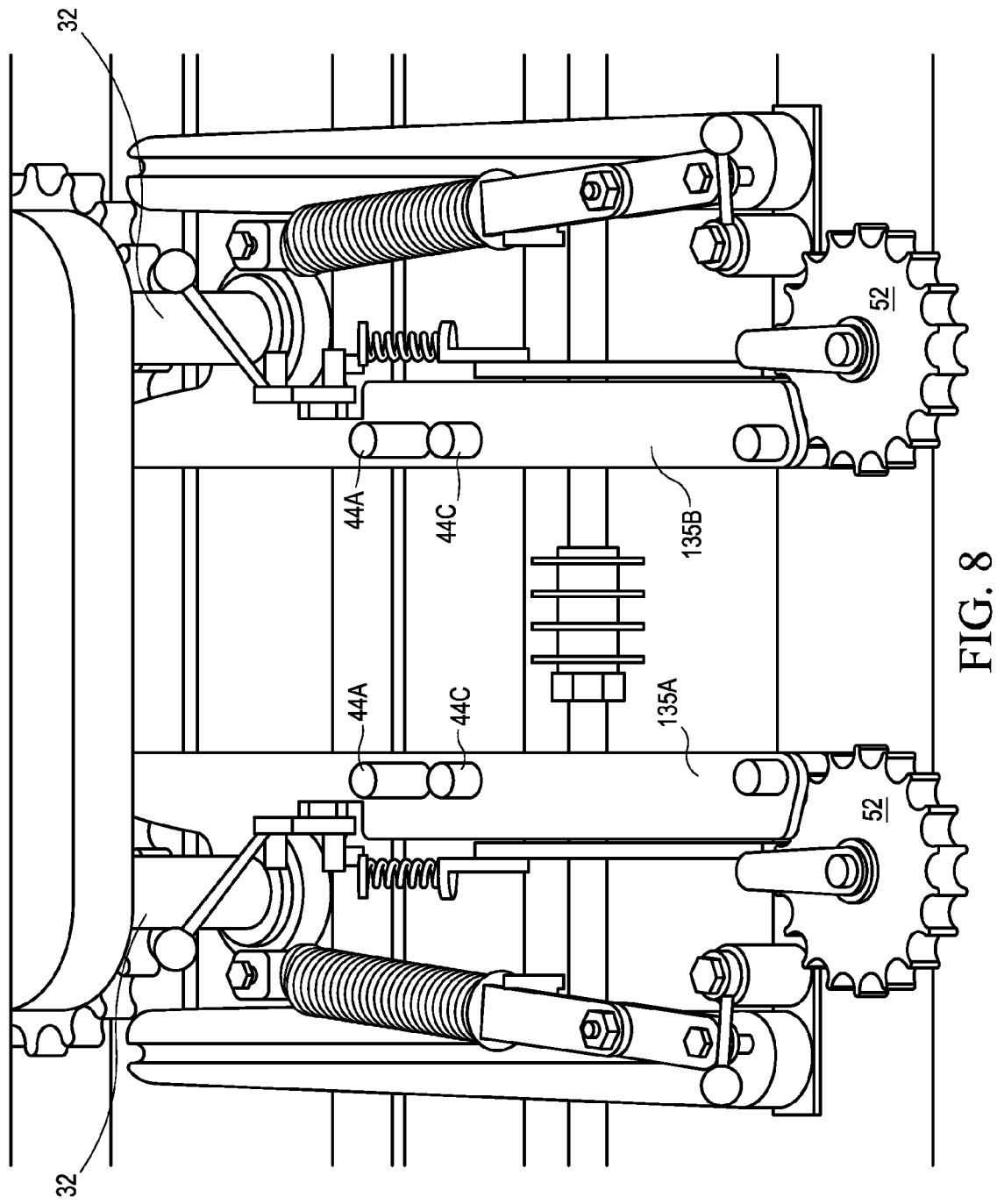
FIG. 8 is a front perspective view of the belt mechanism with the belts and guide assemblies removed to reveal the support plates.

FIG. 8 is a front perspective view of the belt mechanism with the belts and guide assemblies removed to reveal the support plates. The support plate assemblies 135A, 135B are slidingly attached to the support posts 32 so that they can move back and forth towards one another (sideways in this view) in order to create the "pinching" force against the avocado halves passing between the two grip belts [11A, 11B]. As can be seen, the mounting pegs 44A, 44B, 44C, 44D extend upwardly from the plates, upon which the upper guide sections 131A, 136A, 141A mount.

Figure 9:
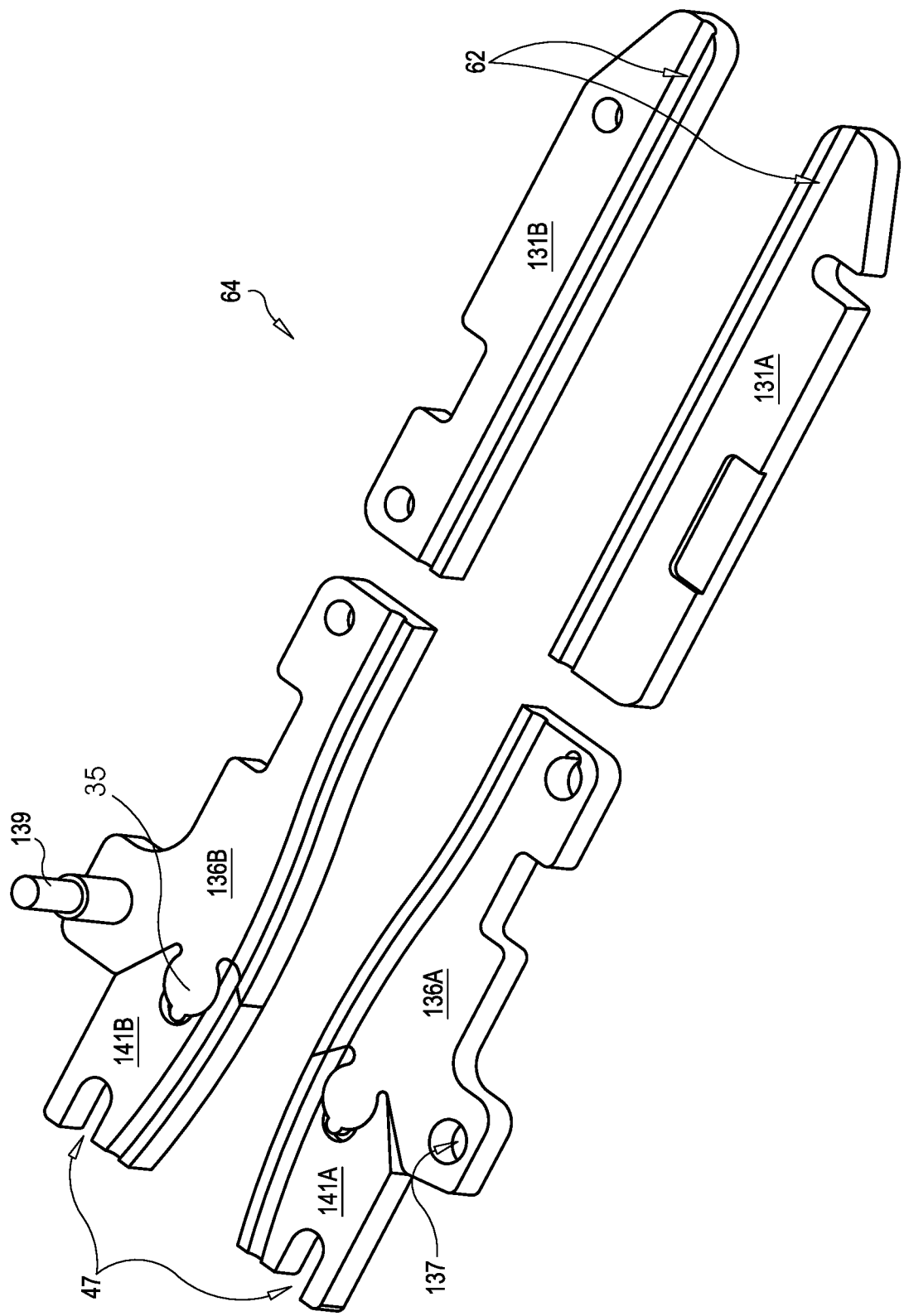
FIG. 9 is a top perspective view of one of the articulating guide assemblies in a disassembled state
Figure 10:
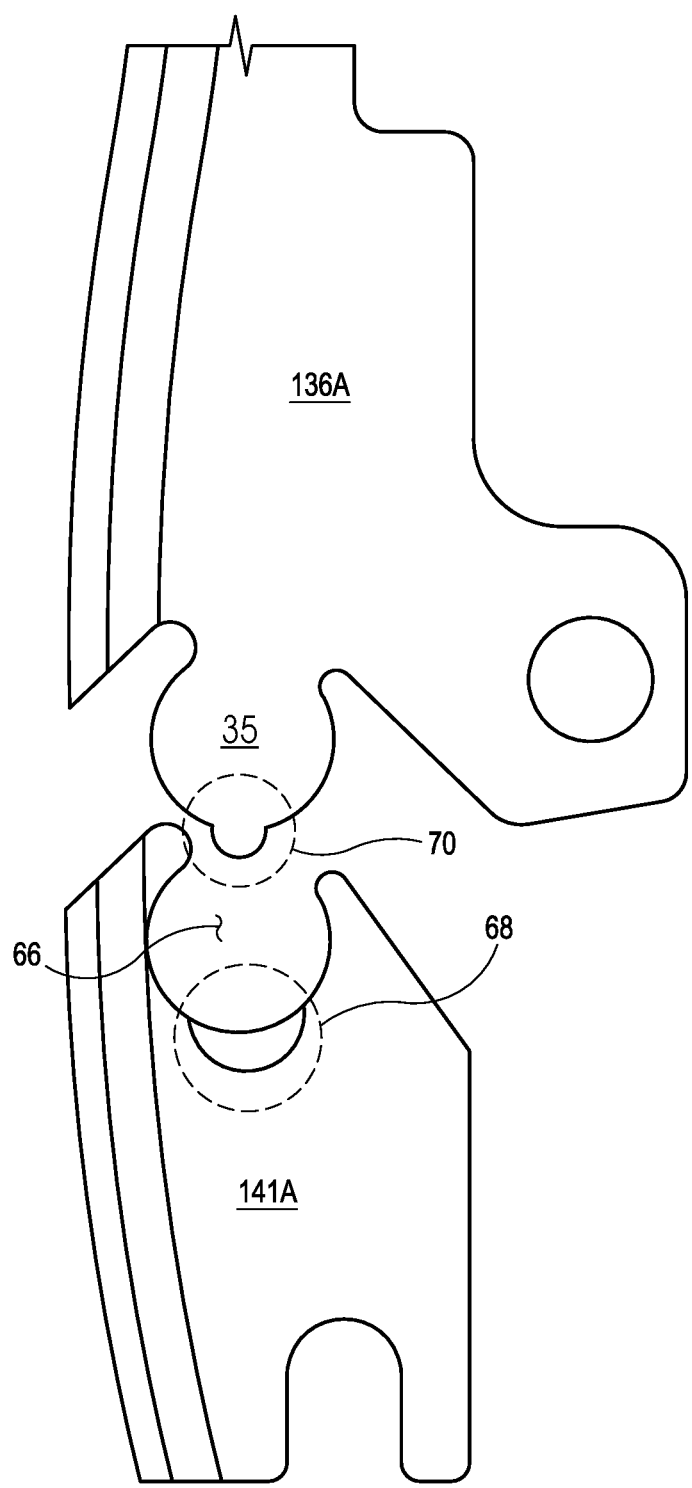
FIG. 10 is a partial top view of the assembly of FIG. 9.

Corresponding mounting pegs also extend downwardly (and not viewable from this perspective) at the same points as those pegs (collectively 44) that can be seen here. The downwardly-pointing mounting pegs (not shown) are virtually identical to those depicted here, with one exception—the downwardly-extending first mounting peg has a flat head (like the head of a nail), which serves to keep the bottom intermediate section [136B] attached to the support plate 135A, 135B (since it hangs from the plate). FIGS. 9 and 10 provide additional detail regarding the guide sections.

FIG. 9 is a top perspective view of one of the articulating guide assemblies 64 in a disassembled state. As discussed previously, each guide assembly 64 has a pair of mated sets of guide sections that are oriented to that the belt grooves 62 face each other when assembled. Rounded slots 47 allow the rear guide sections 141A, 141B to engage the fourth mounting peg [44D], while also permitting the operator to easily remove the guide assembly 64 by sliding it forward (away from fourth mounting peg [44D]) to pull out the assembly 64.

Pinching cost 139 extends upwardly from the bottom intermediate section 136B and is provided to interact with the pinching mechanism [58] discussed above. As should be apparent, the top of the pinching post 139 extends through the pinching post aperture 137 formed through the upper intermediate guide section 136A when the articulating guide assembly is fully assembled on the machine [10].

As shown in FIG. 10, the instant assembly [64], and in particular the interconnection between the rear guide sections and the intermediate sections, has changed. Rather than the index pin [43] design of the device of the Parent Application, now the intermediate and rear guide sections (e.g. 136A, 141A) interface with each other by a modified head element 35. This head element 35 is configured to snap into the socket 66. The index pin [43] has been replaced by a finger element 70, which is an integral part of the intermediate guide section 136A, rather than a separate element. The finger element 70 is a protrusion from the head extension 35 that is not fully the same thickness as the head element 35.

The recessed section 68 formed in the opposite side of the socket 66 cooperates with the finger element 70 (when the two guide sections 136A, 141A are snapped together). It should be apparent that the recessed section 68 is not cut through the entire thickness of the rear guide section 141A, but is only cut deep enough to accommodate the thickness of the finger element 70 therein. The cooperation between the finger element 70 and the recessed section 68 permits angular movement between guide sections 141A, 136A to the point where the finger element 70 strikes either end of the recessed section 68.

Figure 11:
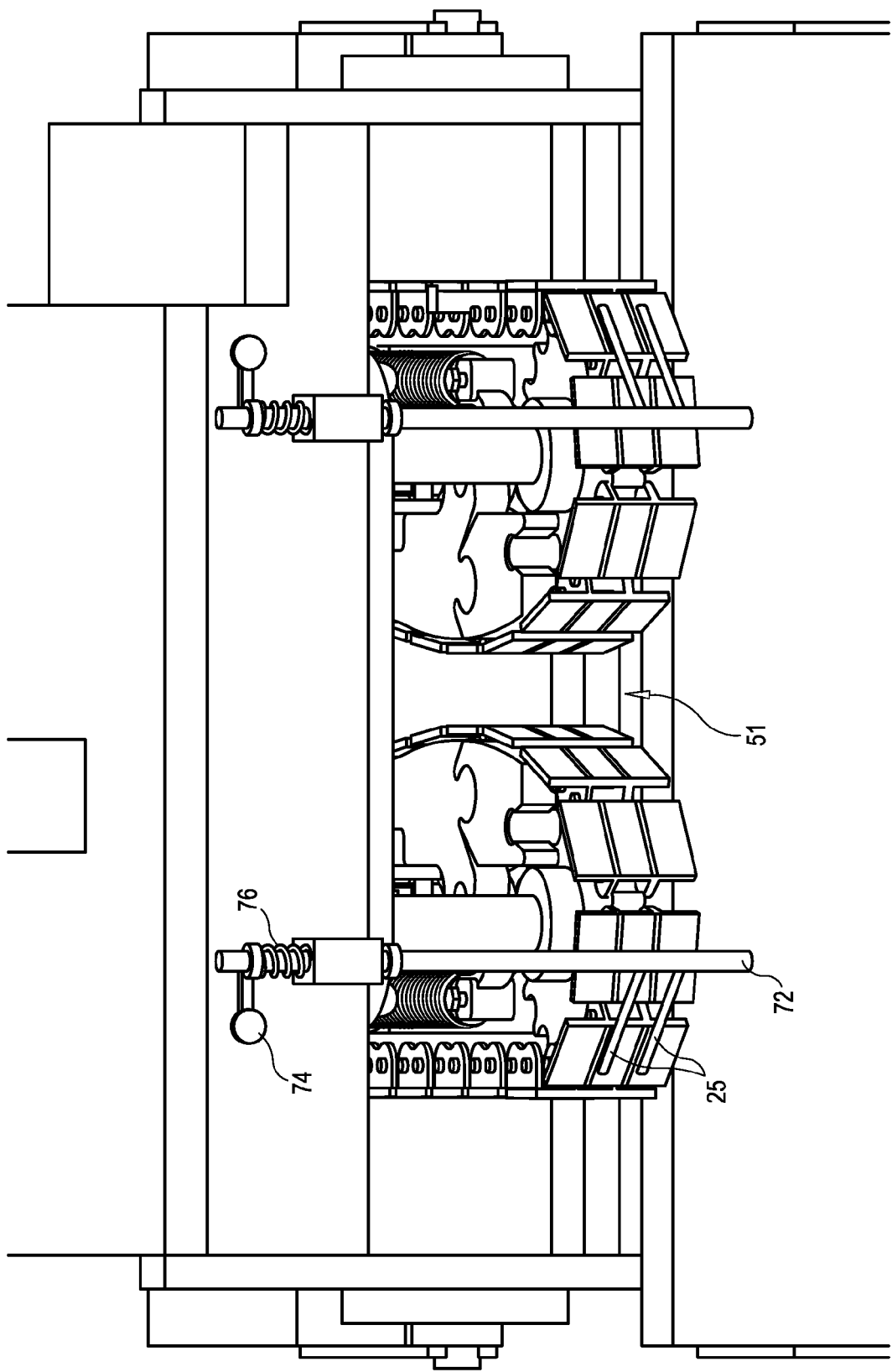
FIG. 11 is a back view of the device of FIGS. 1-2.
Figure 12:
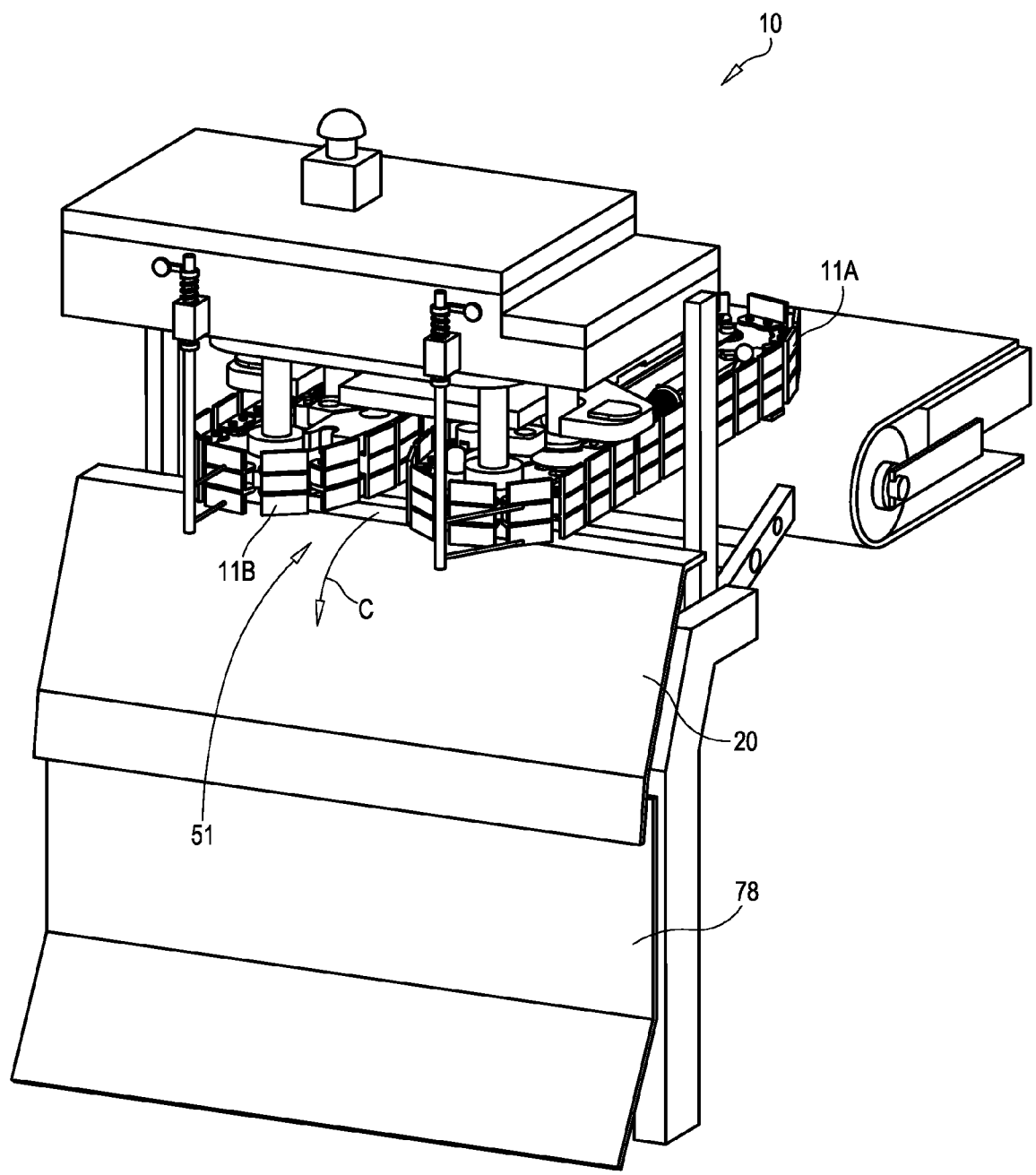
FIG. 12 is a back perspective view of the device of FIGS. 1-2 and 11.

FIGS. 11 and 12 depict the rear end of the device [10], which is substantially unchanged from the device of the Parent Application. The scraping members 25 are provided to scrape off skin and skin fragments stuck to the grooves formed in the grip belt elements while the belts are in operation. Unlike the device of the Parent Application, the empty avocado skins exit the rear opening 51 between the grip belts and travel in direction "C" down the upper end shield 20 and the lower end shield 78. The rear ramps/covers are made in two pieces so that each shield 20 or 78 can be removed independently for cleaning and maintenance, depending upon the particular requirements of the moment. The avocado skins exit from the rear of the device [10] rather than from underneath the grip belts so that there is clear separation between the effluent to avoid the inadvertent cross contamination of the avocado pulp with the empty skins. The pulp exits ahead of the rear opening 51 on the front side of the shields 20 and 78.

The scraping members 25 are biased towards the belt elements by rotational force transmitted down the arms 72 from the adjustable stop members 74. The stop members 74 are equipped with biasing springs 76 that can be adjusted in their biasing force to insure proper scraping force without interfering with the operation of the belts. Each stop member 74 can be released (flipped around) so that the scraping members 25 are completely removed from contact with the grip belts, such as when the operators wish to remove the grip belts for maintenance/cleaning.

Figure 13B:
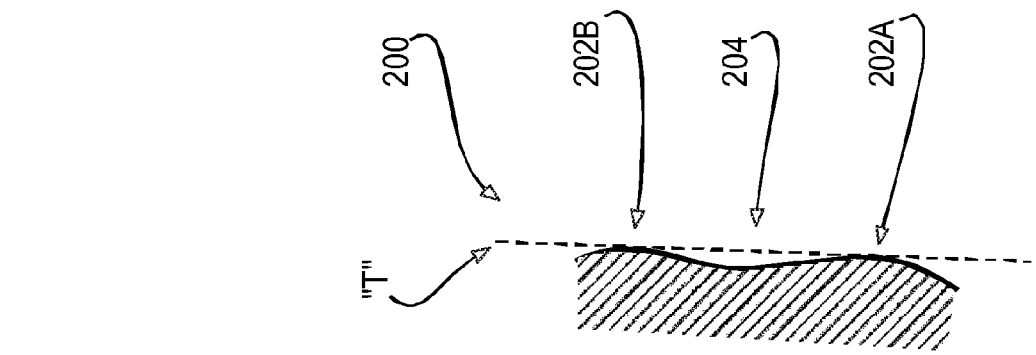
FIGS. 13A and 13B are partial top views of the assembly of FIG. 7, depicting an alternate front guide section.
Figure 13A:
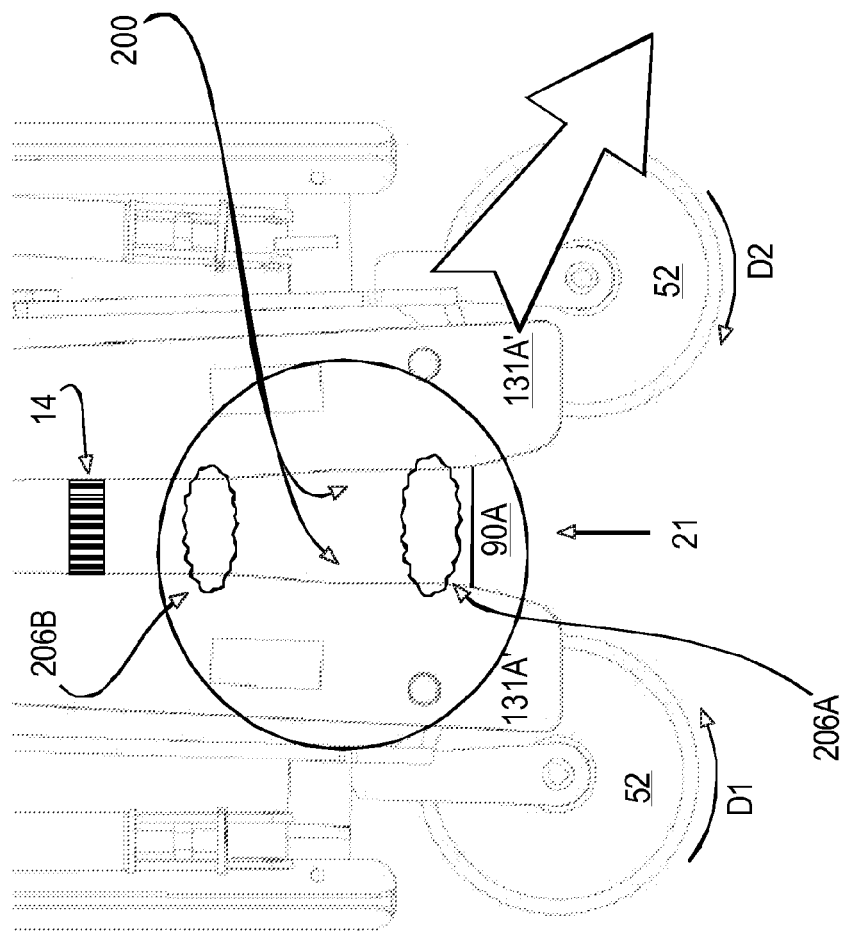

Finally, turning to FIGS. 13A and 13B, we can examine an alternate design for the front guide sections 131A. As is well-known, avocado fruit will tend to exhibit a wide range of textures, depending upon the source of the fruit, the ripeness of each individual piece of fruit, as well as the handling of fruit being processed. In any particular gross lot of fruit, therefore, it is very likely that the hardness of the incoming fruit will vary (sometimes fairly widely). This variation also effects the ease and effectiveness of the equipment to remove the seed and skin from the pulp.

To better handle difficult-to-pulp fruit, an alternate front guide section 131A' was developed. The change in design is related to the interior surfaces of the front guide sections 131A' (as well as the non-depicted lower front guide sections 131B'). In their alternate form, these faces 200 have a double-curved, or double-arcuate shape. While the standard front guide sections 131A, 131B have flat faces, these alternate sections 131A' (and the lower sections) have a pair of "bumps" or curved portions on the facing sides of the front guide sections 131A' so that a first pinch zone 206A and a second pinch zone 206B are created. The change, while seemingly fairly simple, has proven to produce quite impressive results.

The first pinch zone 206A is located near the front opening 21 of the guide sections, just past (i.e. "downstream") the end of the conveyor 90A. The second pinch zone 206B is further down the path between the two guide sections (and belts, when in operation), and is located just upstream of the deseeder 14. Adding a second pinch zone tends to allow the equipment to do a better job of loosening the seed prior to the deseeder 14 actually removing the seed from the fruit.

The first pinch zone 206A is a narrowed portion between the two front guide sections 131A', just as the fruit is leaving the conveyor 90A. The narrowing of the gap causes the incoming fruit to be grasped by the facing belts (not shown), and held up between the belts as the fruit leaves the end of the conveyor 90A. The pinching action keeps the fruit higher up between the belts, and prevents the seed from inadvertently dropping out.

When the fruit reaches the second pinch zone 206B, the second pinching force applied by the grip belts will now cause the seed half to drop down just as the fruit reaches the deseeder 14. This two-squeeze process tends to be consis- tently more effective at the deseeding and pulping of the fruit, where there is a wide variety of textures and hardness in the incoming fruit.

In order to create the individual pinching zones 206A, 206B, the faces 200 of the guide sections 131A' have a pair of facing peaks 202A and 202B bracketing a valley 204. In FIG. 13B, these peaks 202A, 202B and valley 204 have been accentuated in order to make their general arrangement clear to the reader, but not necessarily to depict the actual scale of their size. Furthermore, dashed tangent line "T" has also been provided in order to accentuate the curvature of the faces 200. In practice, the dimensional size of the peaks 202A, 202B and valleys 204 may be adjusted to accommodate the composition of the typical incoming fruit being processed by a particular pulping device of the present invention. Varying the size of the peaks 202A, 202B and valleys 204 will effect the amount of pinching force exerted at the first and second pinching zones 206A, 206B.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed:

1. An avocado pulper having a front and a rear, said avocado pulper comprising:
a first grip belt approximately oval in shape and thereby defining a front end, a back end, and an inner section, and having a plurality of grip plates therearound, said first grip belt being rotated in a first direction toward the rear of the avocado pulper;
a second grip belt approximately oval in shape and thereby defining a front end, a back end, and an inner section, and having a plurality of grip plates therearound, said second grip belt being rotated in a second direction, opposite to said first direction, toward the rear of the avocado pulper wherein said first grip belt and said second grip belt are adjacent to one another and define an opening at their respective front ends for receiving the avocado wherein said plurality of grip plates of said first grip belt and said second grip belt grip the avocado and pass the avocado toward the respective back ends of said first grip belt and said second grip belt and wherein said first grip belt and said second grip belt are in approximate contact with one another at their approximate middles and rearward therefrom;
a conveyor for conveying an avocado to said first and second grip belts;
first and second support plates removably retaining said first and second grip belts, each said support plate supporting
means for squeezing pulp from the avocado and removing its skin as the avocado is passed toward the respective back ends of said first grip belt and said second grip belt wherein said means for squeezing pulp from an avocado and removing its skin being removably attached to and within the inner section of each of said first grip belt and said second grip belt, said means for squeezing pulp from an avocado and removing its skin comprising articulating guide assemblies for guiding said first and second grip belts;
an upper plate guide attachable atop said approximate contact point of said grip belts, said upper plate guide further comprising at least two squeegee pegs extending downwardly from said upper plate guide, one of said pegs in close proximity to said grip plates of said first grip belt and another of said pegs in close proximity to said grip plates of said second grip belt; and motor means for driving said first grip belt and said second grip belt in their respective said first direction and said second direction and wherein said motor means has a drive gear attached to said first grip belt and to said second grip belt.

2. The pulper of claim 1 wherein each of said articulating guide assemblies comprises:

an upper belt guide on one said support plate and within said inner section of one said grip belt and defined by a front guide section, an intermediate guide section and a rear guide section, said intermediate guide section and said rear guide section pivotably attached to one another; and bias means on each said support plate for biasing each respective belt guide inward toward each other with sufficient force to maintain said first grip belt and said second grip belt in approximate contact with one another at their approximate middles and rearward therefrom to thereby squeeze virtually all the pulp from the avocado.

3. The avocado pulper of claim 2, further comprising first tensioning means for selectively tensioning and detensioning said first grip belt, said first tensioning means comprising a first gear tension release lever operable from a first position wherein tension is relieved on said first grip belt to a second position wherein said first grip belt is placed under tension, said first gear tension release lever pivoting on a pivot shaft to cause a first gear release linkage to move generally parallel to said inner section of said first guide belt.

4. The avocado pulper of claim 3, further comprising second tensioning means for selectively tensioning and detensioning said second grip belt, said second tensioning means comprising a second gear tension release lever operable from a first position wherein tension is relieved on said second grip belt to a second position wherein said second grip belt is placed under tension, said second gear tension release lever pivoting on a pivot shaft to cause a second gear release linkage to move generally parallel to said inner section of said second guide belt.

5. The avocado pulper of claim 4, wherein the axes defined by said pivot shafts of said first and second gear tension release levers are generally perpendicular the directions of travel of said respective inner sections of said grip belts.

6. The avocado pulper of claim 5, further comprising a first pinching mechanism for biasing said first grip belt inner section towards said second grip belt inner section, said first pinching mechanism comprising a pinching release lever operable from a first position wherein said biasing is activated to a second position wherein said biasing is deactivated.

7. The avocado pulper of claim 6, further comprising a second pinching mechanism for biasing said second grip belt inner section towards said first grip belt inner section, said second pinching mechanism comprising a pinching release lever operable from a first position wherein said biasing is activated to a second position wherein said biasing is deactivated.

8. The avocado pulper of claim 7, wherein said first and second pinching mechanisms each comprise a series of linkages driving a biasing spring towards and away from a biasing post when said pinching release levers are moved to said first positions and said second positions, respectively.

9. The avocado pulper of claim 8, wherein each said biasing post is attached to a first end of an angle drive element, said angle drive element configured to translate motion of said biasing post from a generally longitudinal direction to a generally transverse direction.

10. The avocado pulper of claim 9, wherein each said angle drive element rotates about a support post interconnecting its respective support plate to said motor means.

11. An avocado pulper having a front and a rear, said avocado pulper comprising:

a first grip belt approximately oval in shape and thereby defining a front end, a back end, and an inner section, and having a plurality of grip plates therearound, said first grip belt being rotated in a first direction whereby said belt travels toward the rear of the avocado pulper at said inner section;

a second grip belt approximately oval in shape and thereby defining a front end, a back end, and an inner section, and having a plurality of grip plates therearound, said second grip belt being rotated in a second direction, opposite to said first direction, whereby said belt travels toward the rear of the avocado pulper at said inner section, wherein said first grip belt and said second grip belt are adjacent to one another and define an opening at their respective front ends for receiving the avocado wherein said plurality of grip plates of said first grip belt and said second grip belt grip the avocado and pass the avocado toward the respective back ends of said first grip belt and said second grip belt and wherein said first grip belt and said second grip belt are in approximate contact with one another at their approximate middles and rearward therefrom;

a conveyor for conveying an avocado to the avocado pulper;

first and second support plates removably retaining said first and second grip belts, each said support plate supporting means for squeezing pulp from the avocado and removing its skin as the avocado is passed toward the respective back ends of said first grip belt and said second grip belt wherein said means for squeezing pulp from an avocado and removing its skin being removably attached to and within the inner section of each of said first grip belt and said second grip belt, said means for squeezing pulp from an avocado and removing its skin comprising articulating guide assemblies for guiding said first and second grip belts;

first and second scraping subassemblies, each said subassembly comprising a rotatable arm extending downwardly in close proximity to said respective grip belt, each said arm having a biasing element at a first end and one or more scraping members extending from an area adjacent to an opposing end, said biasing members configured to bias said arms to rotatably urge said scraping members towards each said respective grip belt;

an upper plate guide attachable atop said approximate contact point of said grip belts; and motor means for driving said first grip belt and said second grip belt in their respective said first direction and said second direction and wherein said motor means has a drive gear attached to said first grip belt and to said second grip belt.

12. The pulper of claim 11 wherein each of said articulating guide assemblies comprises:

an upper belt guide on one said support plate and within said inner section of one said grip belt and defined by a front guide section, an intermediate guide section and a rear guide section, said intermediate guide section and said rear guide section pivotably attached to one another; and bias means on each said support plate for biasing each respective belt guide inward toward each other with sufficient force to maintain said first grip belt and said second grip belt in approximate contact with one another at their approximate middles and rearward therefrom to thereby squeeze virtually all the pulp from the avocado.

13. The pulper of claim 12, wherein each said intermediate guide section further comprises a head element extending therefrom, and each said rear guide section further comprises a socket formed therein, whereby said head element is insertible into said socket to create said pivotable attachment to one another.

14. The pulper of claim 13, wherein each said head element further comprises a finger element further extending therefrom and each said rear guide section further comprises a recessed section extending from said socket, whereby when said head element is inserted into said socket, said finger element extending therefrom will be inserted into said recessed section.

15. The pulper of claim 14, wherein each said finger element defines a thickness that is less than a thickness defined by said head element and each said recessed section has a depth that cooperates with each said finger element thickness.

16. The avocado pulper of claim 15 further comprising de-seeder means from removing a seed from the avocado before the pulp of the avocado is removed from its skin.

17. The avocado pulper of claim 16 wherein said de-seeder means comprises a plurality of rounded structures adjacent to a terminus of said conveyor means, said plurality of rounded structures rotating in a direction opposite a direction of travel of said conveyor means and having a plurality of extending prongs for gripping the seed and extracting the seed from the avocado.

18. The avocado pulper of claim 17 wherein said plurality of extending prongs are star-like or hook-like members.

19. The avocado pulper of claim 18 wherein each grip plate of said plurality of grip plates has at least one cut on opposing ends wherein each cut of said at least one cut is horizontally disposed.

20. The avocado pulper of claim 19 wherein said cut on each of said plurality of grip plates is a radial cut which bears a radius approximately equal to a radius of said drive gear.

21. The avocado pulper of claim 1 further comprising a pulp divider for retaining the pulp removed from the avocado.

22. The avocado pulper of claim 1 wherein each grip plate of said plurality of grip plates of said first grip belt and of said second belt has surfaces which are knurled.

23. The avocado pulper of claim 1 wherein each grip plate of said plurality of grip plates of said first grip belt and of said second belt has a plurality of first grooves with a depth-D1 and corresponding first peaks having a length-L1 from one first peak to an adjacent first and further having a plurality of second grooves with a depth-D2 and corresponding second peaks having a length-L2 from one second peak to an adjacent second peak wherein said plurality of second grooves are approximately perpendicular to said plurality of first grooves.

24. The avocado pulper of claim 23 wherein depth-D1 bears a ratio to length-L1 of approximately 1:3.

25. The avocado pulper of claim 23 wherein said depth-D1 is greater than said depth-D2 and said length-L1 is approximately equal to said length-L2.

26. The avocado pulper of claim 23 wherein said depth-D1 and said depth-D2 range from approximately 0.020 inches deep to approximately 0.080 inches deep.

27. The avocado pulper of claim 23 wherein said depth-D1 is approximately 0.034 inches deep to approximately 0.035 inches deep and said depth-D2 is approximately 0.033 inches deep.

28. The avocado pulper of claim 23 wherein each one of said first peaks and each adjacent one of said second peaks of said first drum and said second drum share a termination point.

29. The avocado pulper of claim 23 wherein said length-L1 and said length-L2 ranges from approximately 0.060 inches to approximately 0.250 inches.

30. The avocado pulper of claim 23 wherein said length-L1 and said length-L2 each are approximately 0.110 inches.

\* \* \* \* \*